United States Patent
Ku et al.

(10) Patent No.: US 8,937,909 B2
(45) Date of Patent: Jan. 20, 2015

(54) SYSTEM AND METHOD OF COMMUNICATION IN AN IP MULTIMEDIA SUBSYSTEM NETWORK

(71) Applicant: AT&T Intellectual Property I, LP, Atlanta, GA (US)

(72) Inventors: Bernard Ku, Austin, TX (US); Chaoxin Qiu, Austin, TX (US); Mehrad Yasrebi, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 13/956,591

(22) Filed: Aug. 1, 2013

(65) Prior Publication Data

US 2013/0315228 A1  Nov. 28, 2013

Related U.S. Application Data

(63) Continuation of application No. 12/832,059, filed on Jul. 7, 2010, now Pat. No. 8,542,632, which is a continuation of application No. 11/677,551, filed on Feb. 21, 2007, now Pat. No. 7,778,231.

(51) Int. Cl.
| | |
|---|---|
| H04W 4/00 | (2009.01) |
| H04M 7/00 | (2006.01) |
| H04W 28/02 | (2009.01) |
| H04W 48/16 | (2009.01) |

(Continued)

(52) U.S. Cl.
CPC .......... *H04M 7/006* (2013.01); *H04W 28/0268* (2013.01); *H04W 48/16* (2013.01); *H04W 28/16* (2013.01); *H04W 28/24* (2013.01); *H04W 48/18* (2013.01); *H04L 12/66* (2013.01)
USPC ........................................ 370/328

(58) Field of Classification Search
None
See application file for complete search history.

(56) References Cited

U.S. PATENT DOCUMENTS

| 6,169,898 B1 * | 1/2001 | Hsu et al. ............... 455/432.3 |
| 6,373,933 B1 * | 4/2002 | Sarkki et al. ............ 379/126 |

(Continued)

FOREIGN PATENT DOCUMENTS

| EP | 1727329 | 11/2006 |
| WO | 2004030434 | 4/2004 |

OTHER PUBLICATIONS

Author Unknown, "Electronic Numbering (ENUM) Management for VoIP Communication", Published May 25, 2005 by Lucent Technologies, pp. 1-10.

(Continued)

*Primary Examiner* — Christopher Crutchfield
(74) *Attorney, Agent, or Firm* — Guntin & Gust, PLC; Jay H. Anderson

(57) ABSTRACT

A system and method of communication in an IMS network is disclosed. An apparatus that incorporates teachings of the present disclosure may include, for example, a call processing server having a controller element that receives from a terminal device a calling ID for establishing communications with a called party, submits to a telephone number mapping (ENUM) server a query corresponding to the calling ID, receives from the ENUM server a plurality of communication identifiers retrieved from a Naming Authority Pointer record according to a grade of service (GoS) of the called party, and selects according to the GoS of the called party a communication identifier from the plurality of communication identifiers to establish communications with the called party. Additional embodiments are disclosed.

20 Claims, 3 Drawing Sheets

(51) Int. Cl.
*H04W 28/16* (2009.01)
*H04W 28/24* (2009.01)
*H04W 48/18* (2009.01)
*H04L 12/66* (2006.01)

(56) References Cited

U.S. PATENT DOCUMENTS

| | | | | |
|---|---|---|---|---|
| 7,260,207 | B2* | 8/2007 | Marsico | 379/220.01 |
| 7,623,843 | B2* | 11/2009 | Squibbs | 455/407 |
| 7,778,231 | B2* | 8/2010 | Ku et al. | 370/338 |
| 8,542,632 | B2* | 9/2013 | Ku et al. | 370/328 |
| 2002/0193132 | A1* | 12/2002 | Wu | 455/513 |
| 2003/0083068 | A1* | 5/2003 | Wong | 455/435 |
| 2003/0100302 | A1* | 5/2003 | Armbruster et al. | 455/433 |
| 2005/0143066 | A1* | 6/2005 | Niemi | 455/432.3 |
| 2006/0067305 | A1 | 3/2006 | Kobayashi et al. | |
| 2008/0182548 | A1 | 7/2008 | Pattison | |

OTHER PUBLICATIONS

Carstens, Juergen, "ENUM/DNS Interface for 3GPP IMS Subscriber Database (HSS) to Ease Provisioning of ENUM Data", Siemens AG, IP.Com PriorArtDatabase, Technical Disclosure, Aug. 25, 2006, p. 1.
Peterson, "Enumservice Registration for Presence Services", ENUM Working Group, Internet Engineering Task Force, Feb. 24, 2003, pp. 1-8.
Shockey et al., "Internet Draft: Privacy and Security Concerns in ENUM, IETF ENUM Working Group", Jul. 2003, pp. 1-17.

* cited by examiner

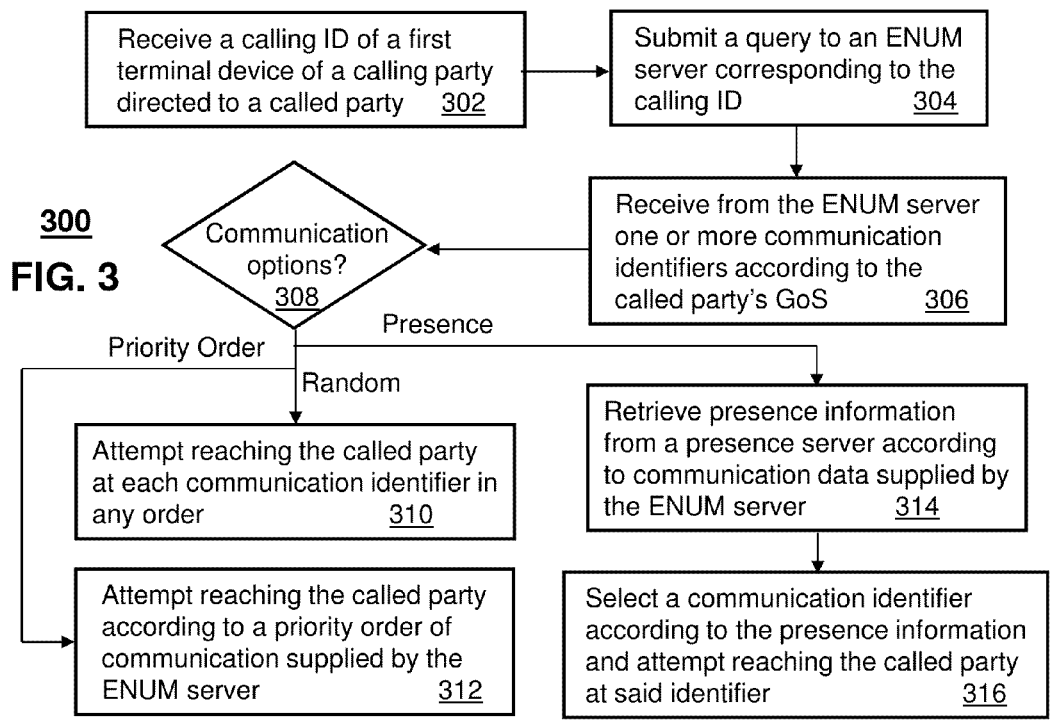
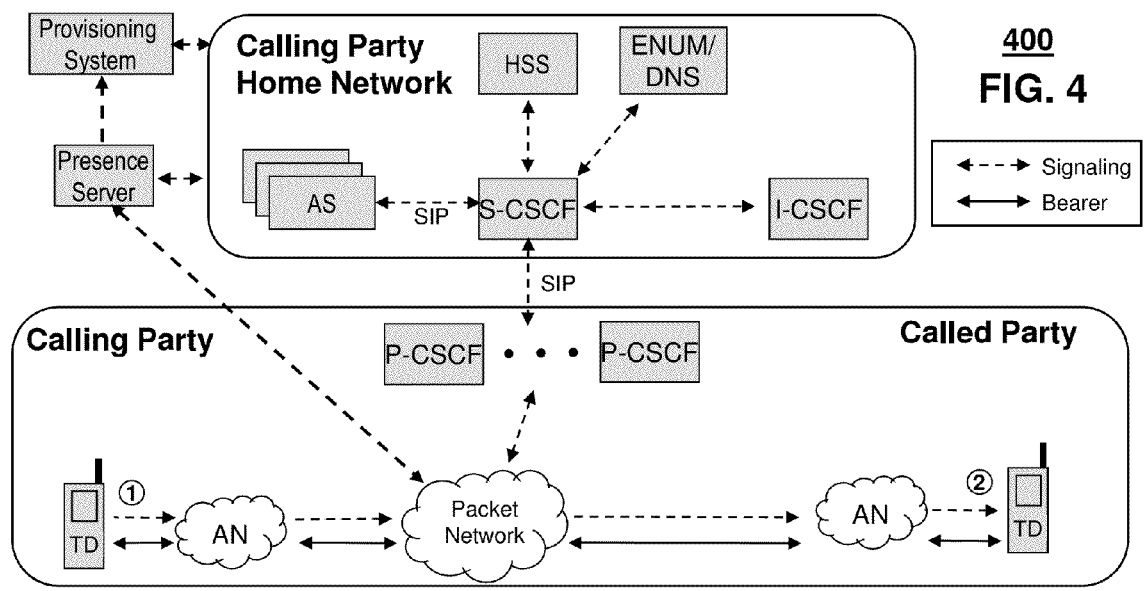

US 8,937,909 B2

SYSTEM AND METHOD OF COMMUNICATION IN AN IP MULTIMEDIA SUBSYSTEM NETWORK

CROSS-REFERENCE TO RELATED APPLICATIONS

This application is a continuation of U.S. patent application Ser. No. 12/832,059, filed Jul. 7, 2010, which is a continuation of U.S. patent application Ser. No. 11/677,551 filed Feb. 21, 2007 by Ku et al., entitled "SYSTEM AND METHOD OF COMMUNICATION IN AN IP MULTIMEDIA SUBSYSTEM NETWORK", which are incorporated herein by reference in their entirety.

FIELD OF THE DISCLOSURE

The present disclosure relates generally to communication techniques and more specifically to a system and method of communication in an IP Multimedia Subsystem (IMS) network.

BACKGROUND

There are many communication resources available to consumers today. A called party can be targeted at, for example, a cell phone, a home phone, an office phone, email, or instant messaging to mention a few. Although IMS advances the convergence of circuit-switched and packet-switched technologies, it does not readily address an efficient manner in which to contact a called party in view of the expansive communication means available to said party.

A need therefore arises for a system and method of communication in an IMS network.

BRIEF DESCRIPTION OF THE DRAWINGS

FIGS. 2-3 depict exemplary methods operating in portions of an IP Multimedia Subsystem (IMS) network;

FIG. 4 depicts an exemplary embodiment of an IMS network from which a plurality of terminal devices operate.

DETAILED DESCRIPTION

Embodiments in accordance with the present disclosure provide a system and method of communication in an IMS network.

In a first embodiment of the present disclosure, a computer-readable storage medium can have computer instructions for updating a Naming Authority Pointer (NAPTR) record associated with an end user with a grade of service (GoS) selected from a plurality of selectable GoSs each comprising a variant of at least one among a plurality of communication identifiers for establishing communications with the end user.

In a second embodiment of the present disclosure, a call processing server (CPS) can have a controller element that receives from a terminal device a calling ID for establishing communications with a called party, submits to a telephone number mapping (ENUM) server a query corresponding to the calling ID, receives from the ENUM server a plurality of communication identifiers retrieved from a NAPTR record according to a GoS of the called party, and selects according to the GoS of the called party a communication identifier from the plurality of communication identifiers to establish communications with the called party.

In a third embodiment of the present disclosure, a computer-readable storage medium in an ENUM server can have computer instructions for submitting to a requesting Call Session Control Function (CSCF) a plurality of communication identifiers retrieved from a Naming Authority Pointer (NAPTR) record structured according to a grade of service (GoS) of an end user associated with said NAPTR record.

In a fourth embodiment of the present disclosure, a computer-readable storage medium in a domain name server (DNS) can have computer instructions for translating a Uniform Resource Identifier (URI) into an Internet Protocol (IP) address and transmitting said IP address to a requesting Call Session Control Function (CSCF). The requesting CSCF can select said URI from one among a plurality of URIs received from an ENUM server that retrieved said plurality of URIs from a NAPTR record structured according to a GoS of an end user associated with said NAPTR record.

In a fifth embodiment of the present disclosure, a computer-readable storage medium in a presence server can have computer instructions for transmitting presence information to a CPS to direct the CPS in its selection of one among a plurality of communication identifiers received from a telephone number mapping (ENUM) server that retrieved said plurality of communication identifiers from a Naming Authority Pointer (NAPTR) record structured according to a grade of service (GoS) of an end user associated with said NAPTR record.

Figure 1:
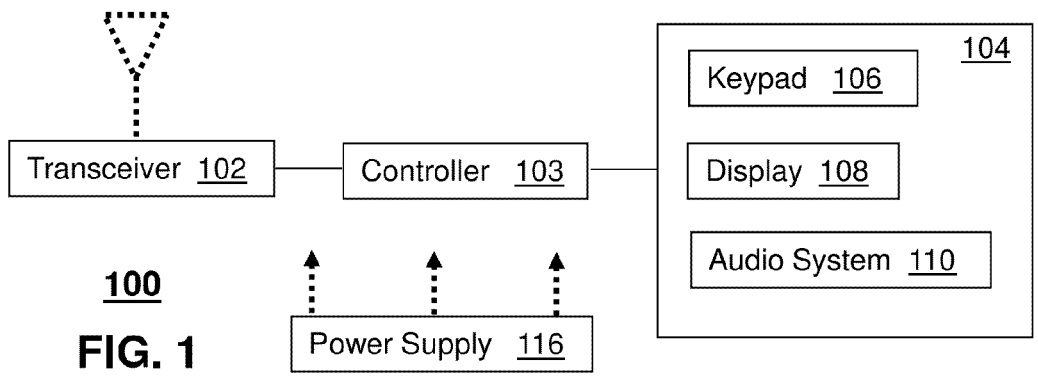
FIG. 1 depicts an exemplary embodiment of a terminal device.

FIG. 1 depicts an exemplary embodiment of a terminal device 100. The terminal device 100 can comprise a wireless or wireline transceiver 102, a user interface (UI) 104, a power supply 116, and a controller 103 for managing operations of the foregoing components. The transceiver 102 can utilize common communication technologies to support singly or in combination any number of wireline access technologies such as cable, xDSL, Public Switched Telephone Network (PSTN), and so on.

Singly or in combination with the wireline technology, the transceiver 102 can support singly or in combination any number of wireless access technologies including without limitation Digital Enhance Cordless Telecommunications (DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. SDR can be utilized for accessing public and private communication spectrum with any number of communication protocols that can be dynamically downloaded over-the-air to the terminal device 100. It should be noted also that next generation wireline and wireless access technologies can also be applied to the present disclosure.

The UI element 104 can include a keypad 106 with depressible or touch sensitive keys and a navigation element such as a navigation disk, button, roller ball, or flywheel for manipulating operations of the terminal device 100. The UI element 104 can further include a display 108 such as monochrome or color LCD (Liquid Crystal Display) which can be touch sensitive for manipulating operations of the terminal device 100 and for conveying images to the end user of said device, and an audio system 110 that utilizes common audio technology for conveying and intercepting audible signals of the end user.

The power supply 116 can utilize common power management technologies such as replaceable batteries, supply regulation technologies, and charging system technologies for supplying energy to the components of the terminal device 100 and to facilitate portable applications. Depending on the type of power supply 116 used, the terminal device 100 can represent an immobile or portable communication device. The controller 103 can utilize computing technologies such as a microprocessor and/or digital signal processor (DSP) with associated storage memory such a Flash, ROM, RAM, SRAM, DRAM or other like technologies for controlling operations of the terminal device 100.

The terminal device 100 can represent a single operational device or a family of devices configured in a master-slave arrangement. In the latter embodiment, the components of the terminal device 100 can be reused in different form factors for the master and slave terminal devices 100. The terminal device 100 can also be represented by any number of communication devices including without limitation a laptop computer, a desktop computer, a cell phone, a personal digital assistant, a set-top-box (STB), or a cordless phone just to name a few. An end user can also utilize more than one type of terminal device 100 and migrate between terminal devices when desired. Additionally, each of the terminal devices 100 can be addressed by one or more communication identifiers for establishing real-time (e.g., voice) and/or non-real time communications (e.g., text or recorded speech).

Figure 2:
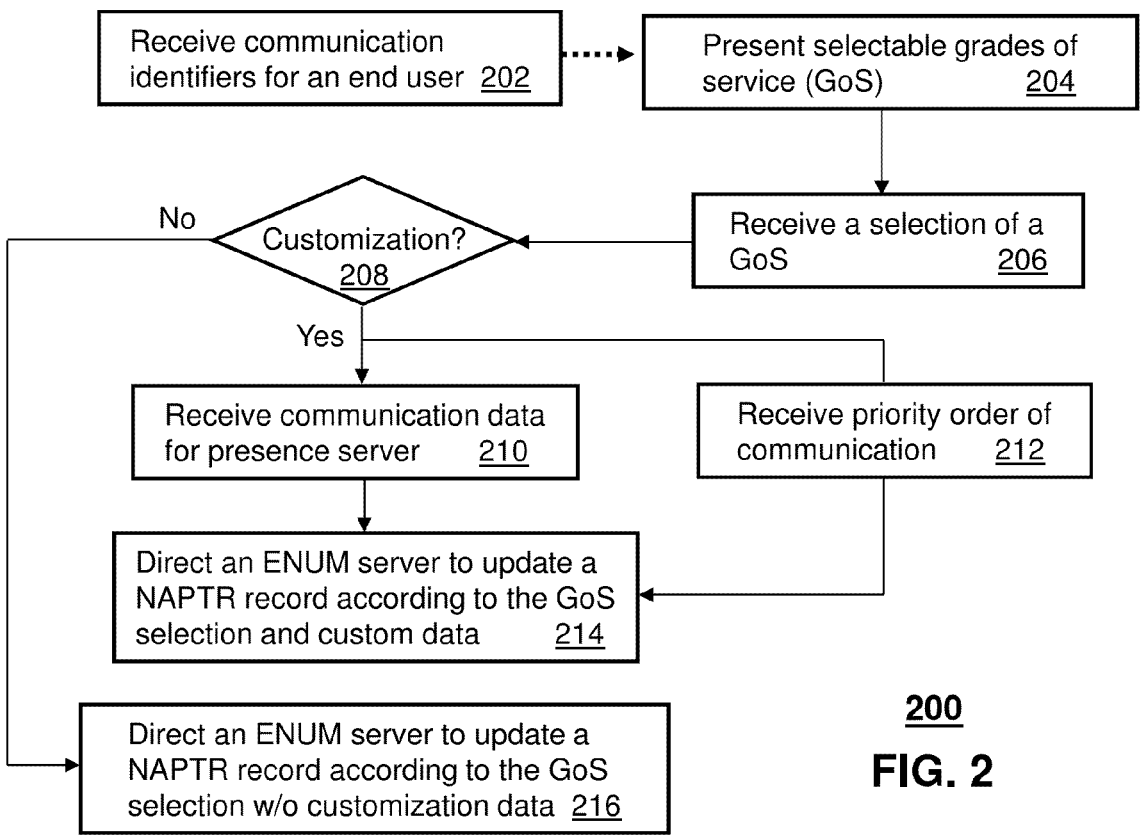

FIGS. 2-3 depict exemplary methods 200-300 operating in portions of an IP Multimedia Subsystem (IMS) network such as shown in FIG. 4. A portion of the IMS network can comprise a Call Processing System (CPS) 400, a Home Subscriber Server (HSS), an tElephone NUmber Mapping (ENUM) and Domain Name Service (DNS) server, an Application Server (AS), an Access Network (AN), a packet-switched network, and two terminal devices 100 denoted by the numbers 1 and 2. The CPS 400 can comprise a number of IMS compliant communication components including without limitation a Proxy Call Session Control Function (P-CSCF), an Interrogating CSCF (I-CSCF), and a Serving CSCF (S-CSCF). Instances of the CPS 400 can be repeated at various points of the IMS network. Signaling and bearer activities are depicted by dashed versus solid lines between terminal devices 100.

A P-CSCF is a Session Initiation Protocol (SIP) proxy serving as a first point of contact to terminals devices 100. An I-CSCF is a SIP proxy that can among other things query the HSS to retrieve a location of a terminal device 100 and route SIP calls to its assigned S-CSCF. A presence server can be queried by the CSCF components of the CPS 400 to derive presence information of a called party by way of the packet-switched network. Presence information associated with an end user can include without limitation a location of the end user, the type of terminal device 100 in use by the end user, the end user's activities (e.g., on an active call, engaging in email exchanges, busy, unavailable by voice but available by text, etc.). The nature of the presence information monitored can be expansive.

An S-CSCF is a SIP server that handles SIP registrations. It can also decide which ASs to forward a SIP message to in order to provide additional services offered by the ASs. ASs can provide routing services using ENUM lookups, and can enforce the policy of a service provider of the IMS network. The ASs can also host and execute value-added IMS services (e.g., Caller ID, Call waiting, Push To Talk, etc.).

The HSS can serve as a master database that supports the IMS network for handling calls. It can contain subscription information. It can also perform authentication and authorization of a terminal device 100. The ENUM/DNS server is a domain name service or DNS-based protocol that is best suited to offer services that expand a means to complete calls over IP networks. It provides a user with a domain name on an E.164 server in order to associate a common international telephone number with a uniform resource identifier or URI and provides other DNS-related services. The DNS function can be used to look up Internet addresses for communication identifiers such as SIP or Tel URIs.

The ANs support wireline or wireless access technologies such as those described earlier for the terminal device 100. The packet-switched network can represent a packet network supporting any number of protocols such as IP, Multi-Protocol Label Switching (MPLS), Asynchronous Transfer Mode/Frame Relay (ATM/FR), and combinations thereof.

Referring back to FIG. 2, method 200 illustrates a means for establishing Grades of Service (GoS) for a select end user (i.e., subscriber of the IMS network). Method 200 begins with step 202 in which a provisioning system such as a common web server receives a plurality of communication identifiers of an end user. The communication identifiers can correspond to session initiation protocol (SIP) Uniform Resource Identifiers (URIs), telephone (Tel) URIs, email addresses, and instant messaging addresses, each of which can be used to establish communications with the end user at different points in time. The SIP and Tel URIs can represent communication identifiers that can be used to establish communications with a cellular communication device, a home communication device, an office communication device, or other types of present and future communication devices available to the end user. The foregoing communication identifiers can be associated with a calling ID that conforms to an E.164 communication standard defined by the International Telecommunication Union (ITU).

The communication identifiers received by the provisioning system can originate from a terminal device 100 of the end user linked to a website supported by the provisioning system. Alternatively, an agent of the service provider of the IMS network (e.g., an operator or synthesis system such as an interactive voice response system or IVR) can receive the communication identifiers via communications with the end user and supply said identifiers to the provisioning system by way of a private website linked to said agent. In step 204, the agent or end user can be presented on a plurality of selectable GoSs which can be retrieved from the HSS (or other comparable IMS database system) from which the agent or end user can supply a selection response in step 206. Each GoS can comprise a variant of the communication identifiers supplied by the end user. Consequently, a GoS selection can be utilized by portions of the CPS 400 as a means to locate the end user by way of a number of communication end points in the IMS network (e.g., cell phone, home office, email, etc.). A service provider of the CPS 400 can charge an end user a service fee for each selectable GoS.

For example, a service provider can offer its subscribers four GoS services: platinum, gold, silver and bronze. Platinum can represent a list of all possible communication identifiers (e.g., all SIP and Tel URIs, email addresses, and instant messaging addresses) associated with a targeted end user. While gold, silver and bronze can each represent an ascending subset of these communication identifiers. With a selected GoS, an S-CSCF and I-CS CF can be provided with a list of options to locate a called subscriber of the IMS network.

Once a GoS is selected, the provisioning system proceeds to step 208 where it checks if the agent or end user has provided supplemental customization features. In one embodiment, the GoS can be supplemented with presence information retrievable from a presence server which the end user has subscribed to by way of the service provider of the CPS 400 or a third party service provider that manages said system. To provide a secured means of retrieving said presence data, the provisioning system can be supplied communication data of the presence server in step 210. The communication data can include among other things a SIP URI for locating the presence server and an authorization code to authorize access to the presence information of a targeted subscriber. The authorization code can be a login and password of the end user or a more sophisticated identification means to authorize the exchange of presence information of an end user with portions of the CPS 400.

Alternatively, the provisioning system can receive in step 212 from the agent or end user a priority order of communication. Said priority order of communication can define, for example, an order of priority for selecting the communication identifiers of a selected GoS to establish communication with the end user (e.g., start with office phone first, then home phone, then instant messaging, and so on). The priority order of communication can be stored as separate fields in the NAPTR record, or can be defined by the order in which communication identifiers are stored in said NAPTR record.

In either of the foregoing supplemental embodiments, the ENUM server is directed by the provisioning system in step 214 to record in its database the GoS and its customization data in a NAPTR record associated with the end user. If no customization data is given, then the provisioning system directs the ENUM server in step 216 to store the GoS in the NAPTR record for random selection of the communication identifiers to establish communications with the end user. The aforementioned provisioning system can be an integral part of the HSS, the CPS 400 or any other suitable component of the IMS network.

Referring to FIG. 3, method 300 describes how components of the CPS 400 process a call initiated by a third party. Beginning with step 302, a P-CSCF receives a calling ID (e.g., an E.164 number) from a terminal device 100 targeting a called party. The P-CSCF forwards the calling ID to the S-CSCF of the calling party's home network which forwards the calling ID as a query to an ENUM server in step 304. The ENUM server retrieves in step 306 from a NAPTR record in its database indexed by the calling ID a plurality of communication identifiers (i.e., SIP URIs, Tel URIs, email addresses, or instant messaging addresses) structured according to a GoS selected by the called party in method 200, and submits said identifiers to the inquiring S-CSCF.

In step 308, the S-CSCF selects one of a number of possible communication options. In one embodiment, the S-CSCF can be directed in step 310 to attempt reaching the called party at each communication identifier in any order. Alternatively, the S-CSCF can be directed in step 312 to attempt reaching the called party according to a given priority order of communication supplied by the ENUM server. Said priority can be based on an order of the communication identifiers supplied by the ENUM server, or priority instructions supplied with the communication identifiers. In yet another embodiment, the ENUM server can supply communication data to the S-CSCF to retrieve in step 314 presence information associated with the called party from a presence server which the called party is subscribed to. The S-CSCF can then select a communication identifier from the list of communication identifiers supplied by the ENUM server according to the presence information retrieved.

For example, the S-CSCF can be programmed to select an instant messaging address as a first attempt for communicating with the called party when the presence information indicates that the called party is on an active conference call using her office phone, but has a presence status of busy for voice communications but available for instant messaging. In other situations, the presence information may indicate that the called party is not busy, but is located at home rather than her office. In this situation, the S-CSCF can be programmed to select a SIP URI for a VoIP home phone (or Tel URI if the called party has a PSTN phone) rather than email or instant messaging. From these examples, it would be apparent to one of ordinary skill in the art that the S-CSCF can be programmed to respond to presence information in any desirable manner.

When a SIP or Tel URI is selected in any of steps 310 through 316, the S-CSCF queries the DNS server of the caller's network for an IP address to communicate with an I-CS CF of the called party's network. The I-CS CF in turn sends a communication invite to the S-CSCF of the called party's network which then prompts a P-CSCF of the called party's network that passes the invite to the called party's terminal device 100 to establish communication. If the terminal device 100 is not available for communication or the called party cannot be reached, the S-CSCF of the calling party's network can be programmed to attempt communication on the next available communication identifier and repeat the foregoing process until the called party is reached.

In summary, methods 200-300 provide subscribers of the IMS network a means to be located by calling parties at a variety of communication points in the IMS network. A priority order of communication applied to communication identifiers of a GoS selected by a called party, and/or presence information retrieved for a called party further supplements the ability to locate a called party. Consequently, the embodiments disclosed herein are an improvement over prior art systems that rely on a single SIP or Tel URI to contact a called party.

Upon reviewing the embodiments disclosed, it would be evident to an artisan with ordinary skill in the art that said embodiments can be modified, reduced, or enhanced without departing from the scope and spirit of the claims described below. For example, a subscriber of the IMS network can dynamically change between GoS settings at different points in time. The subscriber can for instance establish that such changes are to take place automatically each day (e.g., a GoS during working hours, another GoS after-hours, another GoS during the weekend, and so on). This is but one example of a modification that is within the scope of the claims listed below. Accordingly, the reader is directed to the claims section for a fuller understanding of the breadth and scope of the present disclosure.

Figure 5:
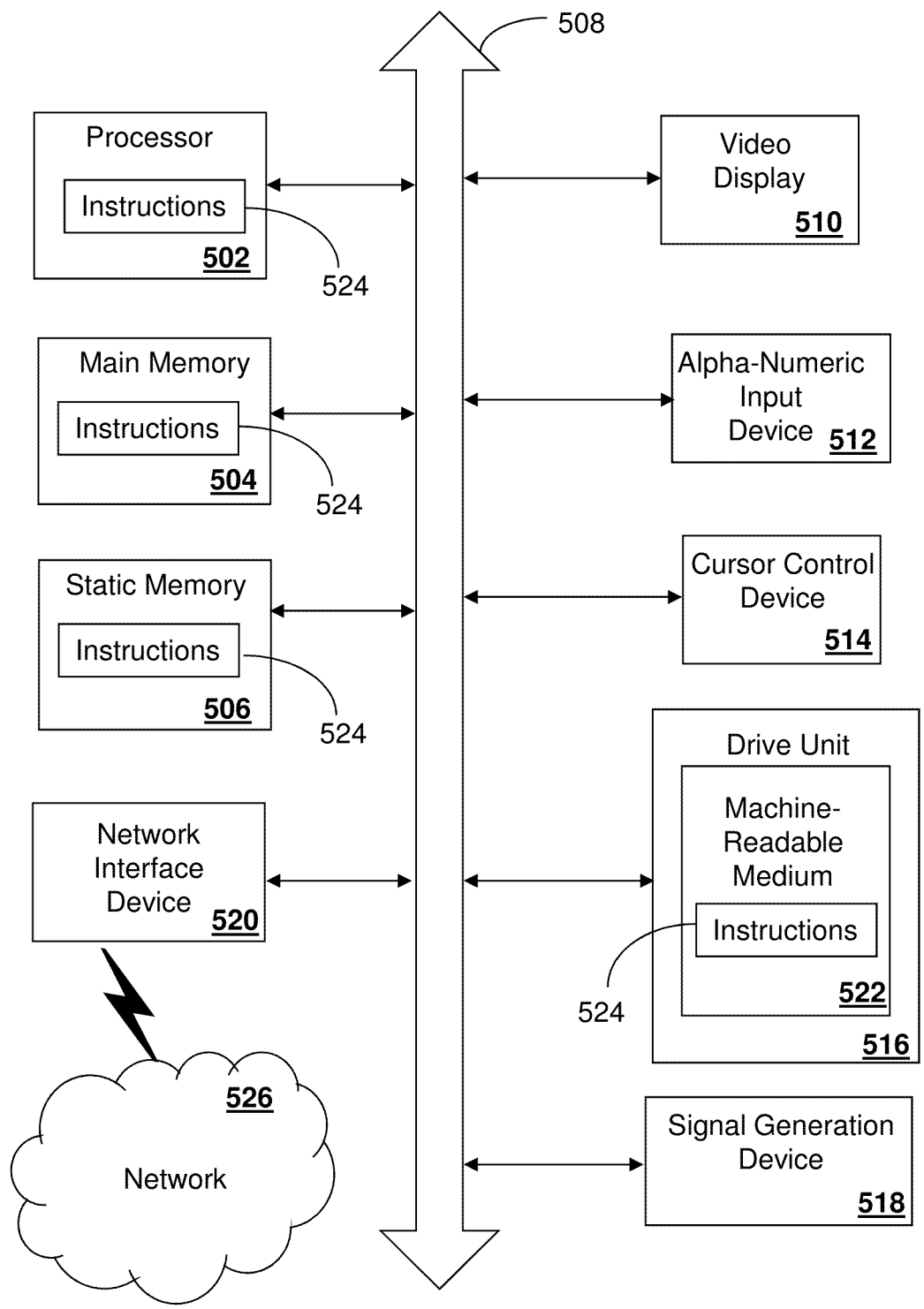
FIG. 5 depicts an exemplary diagrammatic representation of a machine in the form of a computer system within which a set of instructions, when executed, may cause the machine to perform any plurality of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, by a system comprising a processor, a plurality of communication identifiers for an end user of a communication network;
presenting, by the system, an offer of grades of service via a communication device of the end user;
receiving, by the system, a selection of a grade of service from the communication device of the end user in response to the offer;
retrieving, by the system, presence information from a presence server subscribed to by the end user; and
updating, by the system, a database record associated with the end user to record the selection of the grade of service and the presence information,
wherein each of the grades of service comprises a different subset of the communication identifiers,
wherein a given grade of service corresponds to a number of communication identifiers for that grade of service, and
wherein each of the communication identifiers corresponds to a different communication device comprising an end point in the communication network.

2. The method of claim 1, further comprising:
selecting, by the system, one of the communication identifiers and the corresponding communication device to direct a call to the end user, the selecting in accordance with the presence information.

3. The method of claim 2, further comprising:
selecting, by the system, an alternate communication identifier and a corresponding alternate communication device to direct the call, in accordance with the presence information indicating that the end user is not available via the selected one of the communication identifiers.

4. The method of claim 1, further comprising:
retrieving, by the system, a plurality of selectable grades of service from a home subscriber server in the communication network.

5. The method of claim 1, wherein the plurality of communication identifiers are received at a provisioning system from a terminal device of the end user, the provisioning system coupled to the presence server.

6. The method of claim 5, further comprising querying, by the system, a home subscriber server to retrieve a location of the terminal device.

7. The method of claim 5, further comprising supplying, by the system, communication data of the presence server to the provisioning system, wherein the communication data comprises a session initiation protocol uniform resource identifier for locating the presence server and an authorization code for authorizing access to presence information of the end user.

8. The method of claim 1, wherein the communication identifiers comprise session initiation protocol uniform resource identifiers, telephone uniform resource identifiers, email addresses, or instant messaging addresses.

9. The method of claim 1, wherein the selected grade of service comprises all the communication identifiers associated with the end user.

10. A server comprising:
a memory to store instructions; and
a processor coupled to the memory, wherein responsive to executing the instructions, the processor performs operations comprising:
facilitating communication with equipment of an end user of a communication network via an interactive voice response system;
receiving, via the interactive voice response system, a plurality of communication identifiers for the end user;
presenting, via the interactive voice response system, an offer of grades of service at the equipment of the end user;
receiving, via the interactive voice response system, a selection of a grade of service from the end user in response to the offer;
retrieving presence information from a presence server subscribed to by the end user; and
updating a database record associated with the end user to record the selection of the grade of service and the presence information;
wherein each of the grades of service comprises a different subset of the communication identifiers,
wherein a given grade of service corresponds to a number of communication identifiers for that grade of service, and
wherein each of the communication identifiers corresponds to a different communication device comprising an end point in the communication network.

11. The server of claim 10, wherein the operations further comprise processing a service charge to the end user in accordance with the selection of the grade of service.

12. The server of claim 10, wherein the operations further comprise retrieving a plurality of selectable grades of service from a home subscriber server in the communication network.

13. The server of claim 12, wherein the operations further comprise supplying the communication identifiers to a provisioning system by way of a website linked to a provider of the communication network, the provisioning system coupled to the presence server and the home subscriber server.

14. The server of claim 10, wherein the communication identifiers comprise session initiation protocol uniform resource identifiers, telephone uniform resource identifiers, email addresses, or instant messaging addresses.

15. The server of claim 10, wherein the selected grade of service comprises all the communication identifiers associated with the end user.

16. A tangible computer-readable storage device comprising instructions which, when executed by a processor, cause the processor to perform operations comprising:
initiating communication with equipment of an end user of a communication network via an interactive voice response system;
receiving, via the interactive voice response system, a plurality of communication identifiers for the end user;
presenting, via the interactive voice response system, an offer of grades of service at the equipment of the end user;
receiving, via the interactive voice response system, a selection of a grade of service from the equipment of the end user in response to the offer;
retrieving presence information from a presence server subscribed to by the end user and coupled to a home network comprising the equipment of the end user, the home network including a home subscriber server; and
updating a database record associated with the end user to record the selection of the grade of service and the presence information;
wherein each of the grades of service comprises a different subset of the communication identifiers,
wherein a given grade of service corresponds to a number of communication identifiers for that grade of service, and wherein each of the communication identifiers corresponds to a different communication device comprising an end point in the communication network.

17. The tangible computer-readable storage device of claim 16, wherein the operations further comprise processing a service charge to the end user in accordance with the selection of the grade of service.

18. The tangible computer-readable storage device of claim 16, wherein the operations further comprise retrieving a plurality of selectable grades of service from the home subscriber server.

19. The tangible computer-readable storage device of claim 16, wherein the communication identifiers comprise session initiation protocol uniform resource identifiers, telephone uniform resource identifiers, email addresses, or instant messaging addresses.

20. The tangible computer-readable storage device of claim 16, wherein the selected grade of service comprises all the communication identifiers associated with the end user.

* * * * *